Sept. 26, 1933.    M. L. PETIT    1,928,571
MACHINE FOR PRODUCING BLOOD SAUSAGE OR THE LIKE
Original Filed Sept. 19, 1930    3 Sheets-Sheet 2

WITNESSES
William P. Goebel.
Hugh H. Ott

INVENTOR
Milford L. Petit
BY
Munn & Co.
ATTORNEYS

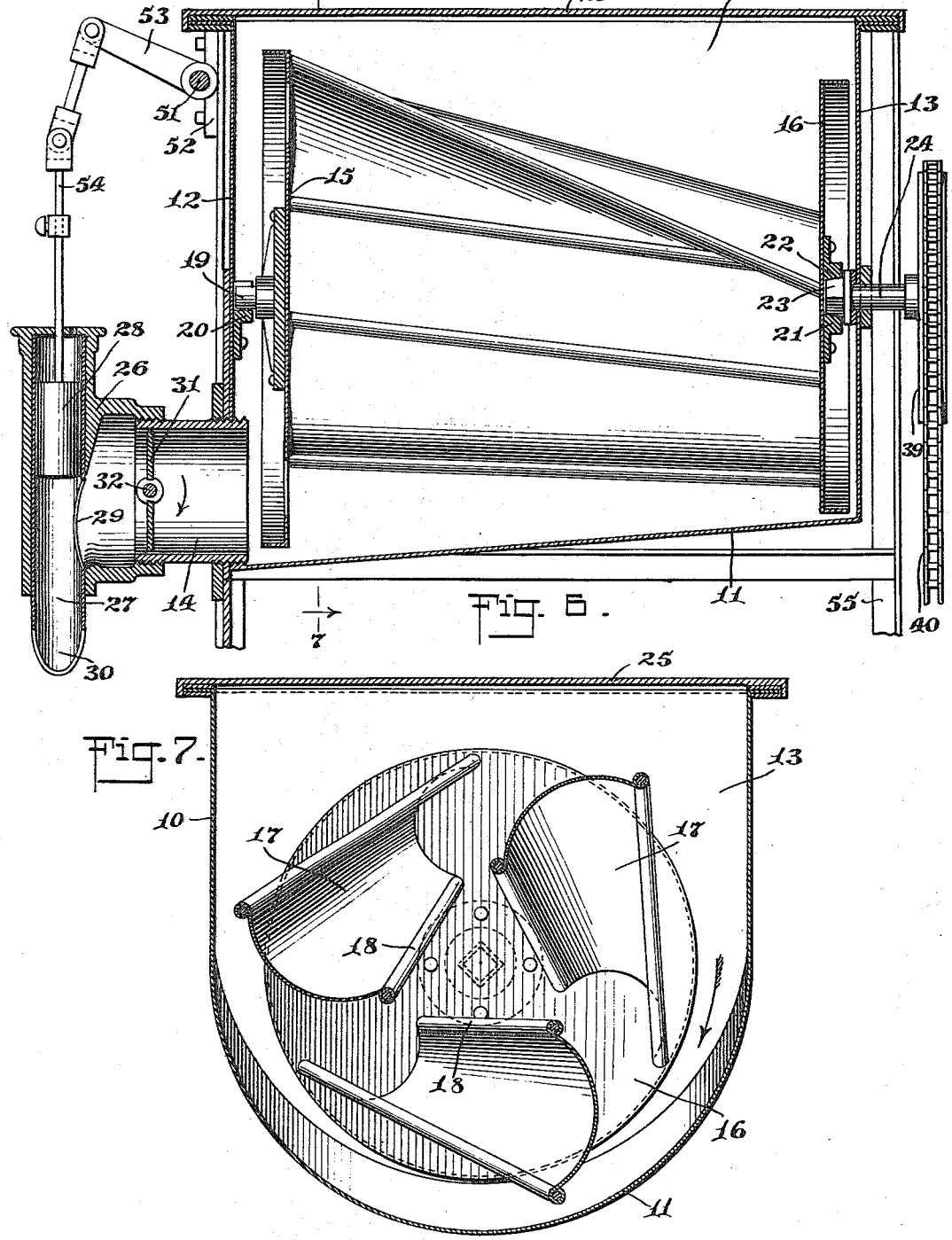

Patented Sept. 26, 1933

1,928,571

UNITED STATES PATENT OFFICE 1,928,571

MACHINE FOR PRODUCING BLOOD SAUSAGE OR THE LIKE

Milford L. Petit, Worcester, Mass., assignor of one-half to Leo Brand, New York, N. Y.

Application September 19, 1930, Serial No. 483,058. Renewed January 3, 1933

9 Claims. (Cl. 259—45)

This invention relates broadly to a machine for continuously effecting the proper mixing of the ingredients of a product and for controlling the discharge of the same from the machine into a receiver, and, while not necessarily restricted to such use, is especially designed for the purpose of mixing the ingredients of blood sausage and the filling or stuffing of the same into the casings.

Up to the present time the manufacture of blood sausage has been accomplished by hand methods without the aid of any type of machine, the ingredients being arranged in a suitable vessel and stirred by hand for an appropriate length of time. While continuing the mixing or stirring of the ingredients, it is dipped out from the vessels and the casings are filled by employing funnels inserted in the upper ends thereof. This hand method is open to numerous objections and possesses many disadvantages, notably, laborious work involved in the continuous mixing or stirring of the ingredients until the entire batch has been filled into the casings, as otherwise the color and character of the product will be so affected as to render it practically unsalable. It has been also observed under the hand method described, that it is practically impossible to obtain a uniform product as to its character, color and taste, while the sanitary conditions prevailing thereunder are not of the highest, due to the fact that the batch cannot be covered and protected.

The present invention aims to overcome the above recited objections and disadvantages by providing a machine which serves to mechanically accomplish a more thorough and uniform mixing of the ingredients continuously and while the same are enclosed and protected from contact with foreign matter and contamination thereby, and thus relieving the operatives of the laborious work of hand mixing and stirring.

The invention further aims to provide in a machine of the indicated character, a controlled discharge in which the ingredients are maintained in a thoroughly mixed condition up to the precise time in which they are introduced into the casings or receptacles, and, further, in which the outlet or discharge controlling means serves to effect a maximum withdrawal or displacement of the air from the casings as the filling or stuffing operation is in progress.

As a still further object, the invention resides in the provision of an agitating or mixing means which is so constructed as to accomplish aeration of the product and a forcible feeding of the same toward and through the discharge outlet and into the casings or receivers.

Other objects of the invention lie in the comparative simplicity of construction and mode of operation of the machine, the economy with which it may be produced, set up and maintained in operating condition and the general efficiency flowing therefrom.

With the above recited and other objects in view, reference is had to the following description and accompanying drawings, in which there is exhibited one example or embodiment of the invention, while the claims define the actual scope of the same.

In the drawings:

Figure 6 is a fragmentary enlarged longitudinal sectional view.

Figure 7 is a transverse sectional view therethrough taken approximately on the line indicated at 7—7 of Figure 6.

Figure 1:
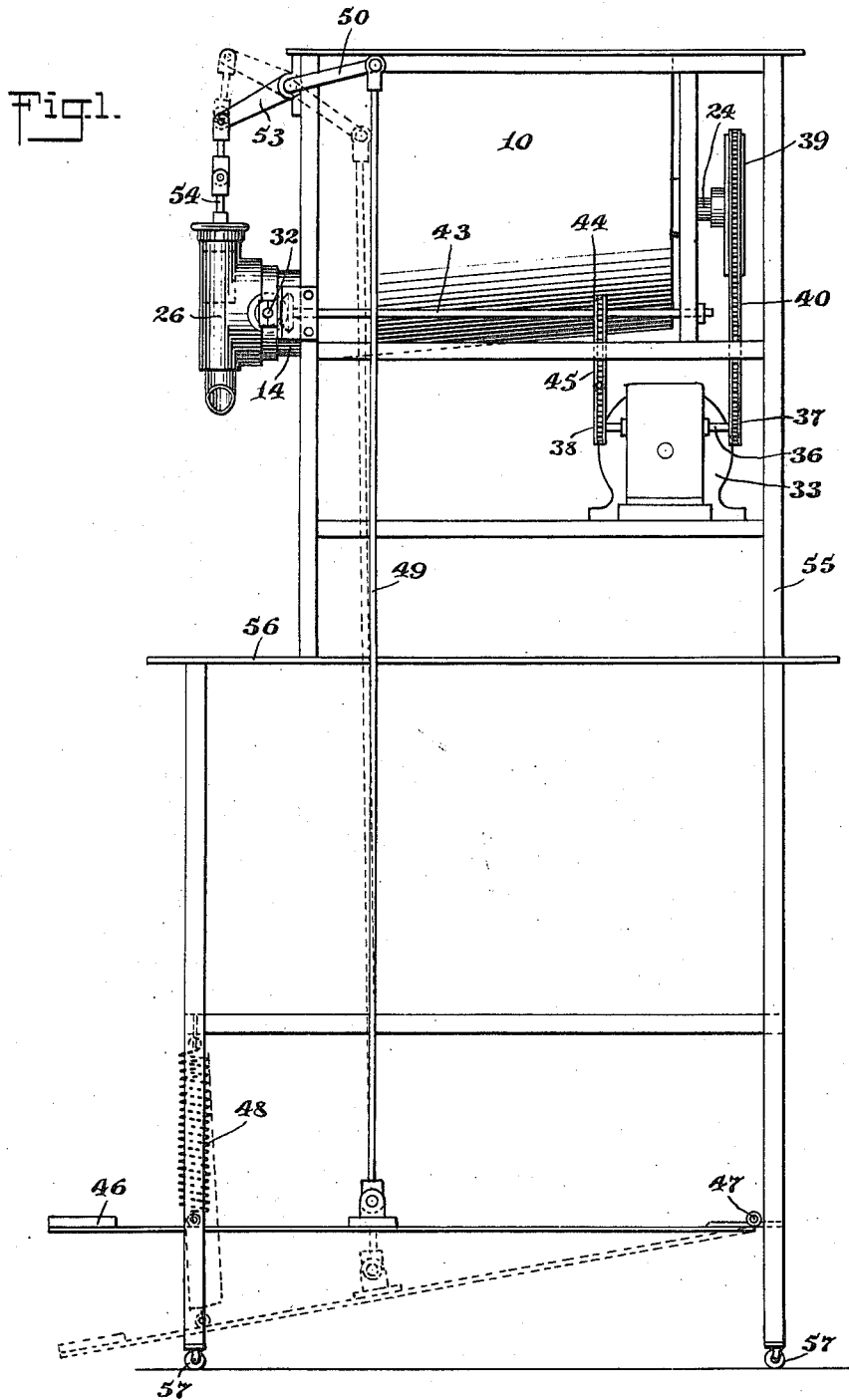
Figure 1 is a side view of a machine constructed in accordance with the invention.
Figure 2:
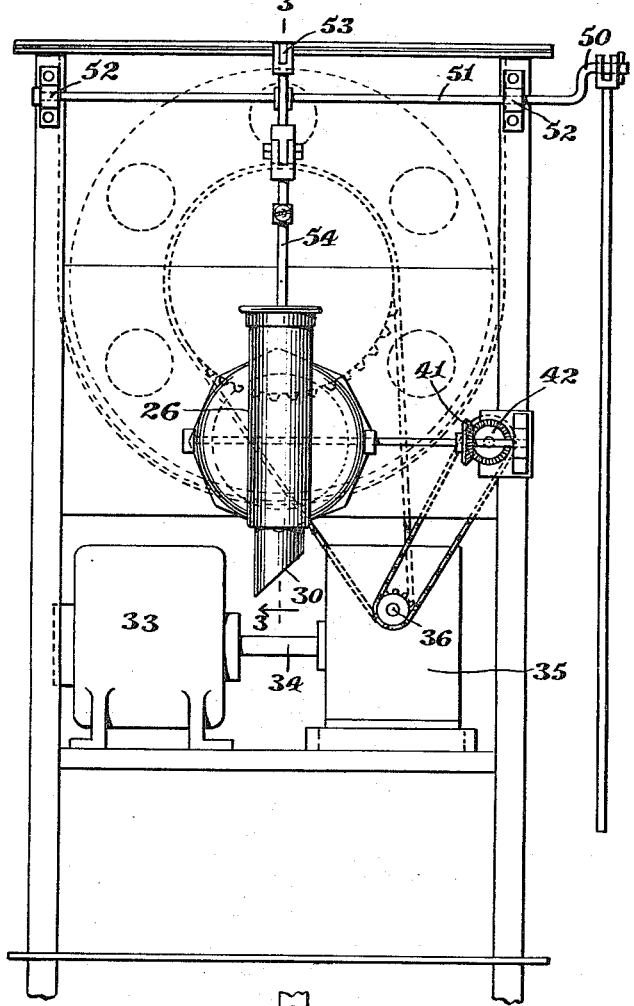
Figure 2 is a front view thereof.
Figure 4:
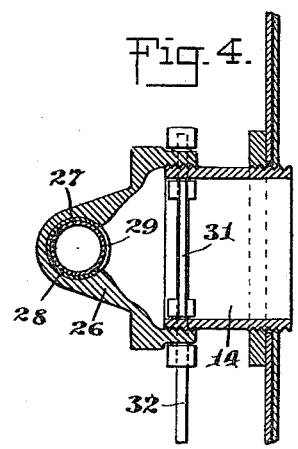
Figure 4 is a fragmentary horizontal sectional view taken approximately on the line 4—4 of Figure 3.

Referring to the drawings by characters of reference, the machine essentially includes a vessel 10 having a semi-cylindrical bottom 11 which is inclined from the front wall 12 to the rear wall 13 to gravitationally feed the contents toward the discharge outlet pipe 14 which extends through the medial lower portion of the front wall 12 and communicates with the interior of the vessel 10. A mixing and feeding means is mounted within the vessel 10 on a longitudinally extending horizontal axis, and said means preferably includes front and rear circular heads 15 and 16 disposed respectively in close proximity to the front and rear walls 12 and 13 of the vessel. The heads 15 and 16 are connected by longitudinally extending circumferentially spaced cross sectionally arcuate concavo-convex blades 17, the concave sides of which are disposed in the direction of rotation of the mixing and feeding means. It will also be observed that the blades 17 are twisted in such a manner that the material lifted or scooped up and elevated thereby is caused to travel in a forward direction while being spilled over the trailing edges 18 thereof as the blades reach their discharge position. This tends to thoroughly aerate the substance being operated upon while insuring a thorough and uniform mixture of the ingredients, and additionally sets up a tendency to effect a forward feeding of the contents of the vessel toward the discharge outlet pipe 14 in excess of the normal gravitational feeding due to the forward inclination of the bottom level of the vessel. The mixing and feeding means may be supported and rotated in the direction indicated by the arrow in Figure 6 in any desired manner, but, as illustrated, the forward head 15 is provided with a concentric forwardly projecting trunnion 19 which is removably positioned in a suitable bearing 20 carried by the inner surface of the front wall 12 of the vessel. The rear head 16 is provided with a concentric rearwardly projecting boss 21 having a non-circular opening or socket 22 which fits over a correspondingly shaped terminal 23 of a drive shaft 24 which extends through the rear wall 13 of the vessel and is suitably rotated in the direction indicated. The removable mounting of the mixing and feeding means permits of its displacement for the purpose of thoroughly cleansing said means, as well as the interior of the vessel 10.

In practice, the upper open end of the vessel 10 is provided with a removable cover 25 which is displaced for the purpose of charging or introducing the ingredients thereto or for removing the mixing and feeding means therefrom. The discharge outlet pipe has secured to its outer end a stuffing or filling nozzle 26 which connects therewith and which is provided with a vertical cylindrical bore 27. The bore 27 has mounted for vertical movement therein a piston or plunger 28 which in its raised position uncovers a port 29, and which piston or plunger in its lowered position closes the said port or plunger 28, whereby the discharge of the contents of the vessel 10 may be controlled from the lower open end 30 of the nozzle 26, it being understood that the casing or other receiver has its upper open end telescopically positioned thereover. In order to maintain the contents which are being discharged from the vessel 10 in a thoroughly mixed condition up to the precise time in which it is introduced to the casing or receiver, a rotary paddle 31 is mounted on a transverse shaft 32 within the outer end of the discharge outlet pipe 14 and, obviously, this paddle serves to maintain that portion of the contents contained within the pipe 14 and the nozzle 26 in its mixed condition irrespective of the length of time the piston or plunger 28 may remain in its closed relation to the port 29.

While the mixing and feeding means within the vessel 10 and the paddle 31 may be driven in any desired manner, for the purpose of illustration a motor 33 is shown, the shaft 34 of which through suitable reducing gears contained in a gear box 35 rotates a counter-shaft 36, the opposite protruding extremities of which are provided with sprockets 37 and 38. A sprocket 39 is secured to the drive shaft 24 for the mixing and feeding means in the vessel 10, and a sprocket chain 40 is trained about the sprockets 37 and 39. The shaft 32 of the paddle 31 has secured to its protruding portion a beveled pinion 41 which meshes with a bevel gear 42 on a rearwardly extending shaft 43, and said shaft 43 has secured thereto a sprocket 44 which is driven through the medium of a sprocket chain 45 trained around the sprocket 38.

Figure 3:
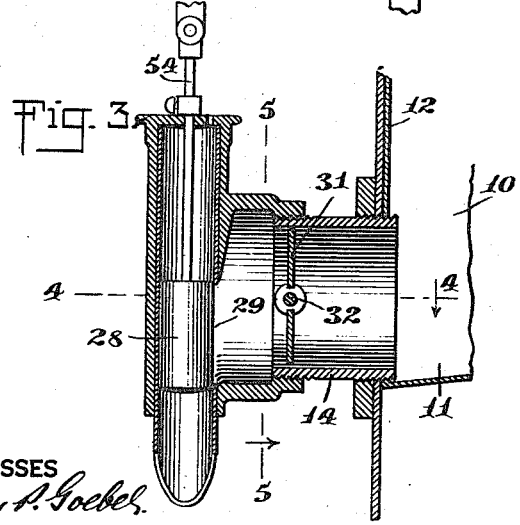
Figure 3 is a fragmentary enlarged vertical sectional view through the outlet, taken approximately on the line 3—3 of Figure 2.
Figure 5:
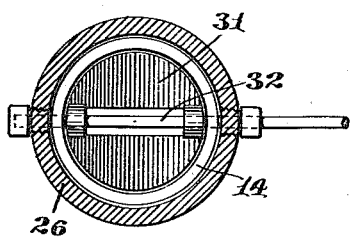
Figure 5 is a detail sectional view taken approximately on the line 5—5 of Figure 3.

In order that the hands of an operator may be left free to position the casings or receivers over the outlet nozzle 26, the piston or plunger 28 is preferably operated by a foot pedal 46 which is fulcrumed at 47 and normally elevated by a spring 48. The pedal 46 is connected by a connecting rod 49 to the crank arm 50 of a crank shaft 51 which is journaled in bearings 52, and the crank shaft is provided with a second crank arm 53 which is operatively connected to the piston or plunger rod 54. When the pedal is in the normal raised position illustrated in full lines in Figure 1, the piston or plunger 28 is in its lowered position illustrated in Figure 3, and when the pedal is depressed to the dotted line position illustrated in Figure 1, the piston or plunger 28 is elevated to the position illustrated in Figure 6.

In use and operation, the ingredients to be mixed are introduced to the vessel 10 and the cover 25 arranged thereover to protect them from contact with foreign matter and contamination thereby. The motor continuously rotates the feeding and mixing means, as well as the paddle 31, until such time as the batch is ready for introduction to the casings or receivers. The operator stands in front of the machine and positions the upper open end of the casing over the outlet nozzle 26, depressing the foot pedal 46. The upward movement of the plunger or piston 28 serves to withdraw or displace to a maximum the air from the casings immediately prior to the filling or stuffing of the ingredients therein. Due to the construction of the mixing and feeding means, a pressure is exerted which tends to thoroughly stuff or fill the casing. When the casing is filled, the operator releases the foot pedal 46, permitting the spring 48 to function to again lift the pedal, thereby causing the plunger or piston 28 to descend and close the outlet port 29. The casing is then removed in its filled condition and tied. In event the operator is compelled to leave the machine for any length of time, the continued mixing of ingredients will continue without personal attention. It is also possible with the present machine to add further ingredients to the batch during the running of the same therethrough by merely interrupting the filling or stuffing operation until a sufficient time has elapsed to insure the mixing of the added ingredients.

It is obvious that the device may be mounted or supported in any desired manner, but, as shown, a framework 55 is disclosed which is preferably provided with a shelf or table 56 upon which the empty and filled casings may be laid, while the lower ends of the framework are provided with casters 57, whereby the machine may be readily moved.

What is claimed:

1. In a machine for producing blood sausage or the like, a vessel for the reception of ingredients to be mixed, said vessel having a discharge outlet at its lower end and means within said vessel operable to continuously lift and spill the ingredients to effect the mixing and aeration thereof and to feed said mixed ingredients under a pressure toward the discharge outlet, said means comprising a rotary member having cross sectionally concavo-convex longitudinally twisted trough like blades functioning upon rotation thereof, to successively lift and spill the contents while imparting a movement of the same in the direction of the discharge outlet.

2. In a machine for producing blood sausage or the like, a vessel for the reception of ingredients to be mixed, said vessel having a discharge outlet at its lower end, rotary means within said vessel operable to continuously mix and aerate the contents and to feed the same under a pressure toward the discharge outlet, a stuffing nozzle communicating with and disposed at an angle to the discharge outlet with which receivers are adapted to be associated and a plunger in said nozzle operable to open and close the same for controlling the discharge of the contents from the vessel.

3. In a machine for producing blood sausage or the like, a vessel for the reception of ingredients to be mixed, said vessel having a discharge outlet at its lower end, rotary means within said vessel operable to continuously mix and aerate the contents and to feed the same under a pressure toward the discharge outlet, a stuffing nozzle communicating with and disposed at an angle to the discharge outlet with which receivers are adapted to be associated and a plunger in said nozzle operable to open and close the same for controlling the discharge of the contents from the vessel, said plunger operable upon movement in a direction to open the nozzle, to withdraw air from a receiver fitted over the nozzle outlet.

4. In a machine for producing blood sausage or the like, a vessel for the reception of ingredients to be mixed, said vessel having a discharge outlet at its lower end, rotary means within said vessel operable to continuously mix and aerate the contents and to feed the same under a pressure toward the discharge outlet, a stuffing nozzle communicating with and disposed at an angle to the discharge outlet with which receivers are adapted to be associated and a plunger in said nozzle operable to open and close the same for controlling the discharge of the contents from the vessel, said plunger operable upon movement in a direction to open the nozzle, to withdraw air from a receiver fitted over the nozzle outlet and functioning upon movement in the direction to close the nozzle to tamp or pack the contents of the receiver therein.

5. In a machine for producing blood sausage or the like, a vessel having a discharge outlet and provided with continuously operable mechanically actuated rotary means therein for mixing, aerating and feeding the contents under a pressure through said outlet, a stuffing nozzle connected to and communicating with the outlet and over which nozzle receivers are adapted to be fitted, said nozzle having a manually controlled reciprocating plunger therein operable to open and close the nozzle outlet to control the discharge of the contents from the vessel.

6. In a machine for producing blood sausage or the like, a vessel having a discharge outlet and provided with continuously operable mechanically actuated rotary means therein for mixing, aerating and feeding the contents under a pressure through said outlet, a stuffing nozzle connected to and communicating with the outlet and over which nozzle receivers are adapted to be fitted, said nozzle having a manually controlled reciprocating plunger therein operable to open and close the nozzle outlet to control the discharge of the contents from the vessel and continuously driven mechanically operated means within the discharge outlet for maintaining that portion of the contents contained therein, thoroughly mixed, up to the time of discharge from the nozzle into the receivers.

7. In a machine for producing blood sausage or the like, a vessel including a semi-cylindrical bottom inclined from the front to the rear wall and having a controlled discharge outlet in the lower medial portion of the front wall, a mixing, aerating and feeding means in said vessel mounted for rotation on a horizontal axis and comprising a pair of circular heads and longitudinally twisted trough like blades connecting the same having a trailing edge disposed at an inclination for lifting and spilling the contents while imparting movement thereto in a forward direction to feed the same under pressure through the discharge outlet while maintaining the contents in a thoroughly mixed and aerated condition.

8. In a machine for producing blood sausage or the like, a vessel including a semi-cylindrical bottom inclined from the front to the rear wall and having a controlled discharge outlet in the lower medial portion of the front wall, a mixing, aerating and feeding means in said vessel mounted for rotation on a horizontal axis and comprising a pair of circular heads and longitudinally twisted trough like blades connecting the same having a trailing edge disposed at an inclination for lifting and spilling the contents while imparting movement thereto in a forward direction to feed the same under pressure through the discharge outlet while maintaining the contents in a thoroughly mixed and aerated condition and a rotary mixing paddle within the discharge outlet.

9. In a machine for producing blood sausage or the like, a vessel including a semi-cylindrical bottom inclined from the front to the rear wall and having a controlled discharge outlet in the lower medial portion of the front wall, a mixing, aerating and feeding means in said vessel mounted for rotation on a horizontal axis and comprising a pair of circular heads and longitudinally twisted trough like blades connecting the same having a trailing edge disposed at an inclination for lifting and spilling the contents while imparting movement thereto in a forward direction to feed the same under pressure through the discharge outlet while maintaining the contents in a thoroughly mixed and aerated condition, a rotary mixing paddle within the discharge outlet and a common means for driving the mixing, aerating and feeding means and said mixing paddle.

MILFORD L. PETIT.